(12) United States Patent
Engmann et al.

(10) Patent No.: US 7,533,263 B2
(45) Date of Patent: May 12, 2009

(54) SYSTEM AND METHOD FOR REGISTERING A SUBSCRIBER STATION ON THE PACKET SERVICE CALL STATE CONTROL FUNCTION CSCF IN A COMMUNICATIONS SYSTEM

(75) Inventors: Steffen Engmann, München (DE); Uwe Foell, Falkensee (DE); Elmar Haas, Unterhaching (DE); Ralf Jasper, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 739 days.

(21) Appl. No.: 10/276,973

(22) PCT Filed: May 17, 2001
(Under 37 CFR 1.47)

(86) PCT No.: PCT/DE01/01890

§ 371 (c)(1),
(2), (4) Date: Aug. 4, 2003

(87) PCT Pub. No.: WO01/91483

PCT Pub. Date: Nov. 29, 2001

(65) Prior Publication Data
US 2004/0190492 A1    Sep. 30, 2004

(30) Foreign Application Priority Data
May 22, 2000 (DE) .................. 100 25 270

(51) Int. Cl.
*H04L 9/00* (2006.01)
(52) U.S. Cl. ..................... 713/168; 713/150
(58) Field of Classification Search .......... None
See application file for complete search history.

(56) References Cited

U.S. PATENT DOCUMENTS 6,707,813 B1 *   3/2004   Hasan et al. ................ 370/356

FOREIGN PATENT DOCUMENTS

| EP | 0 859 531 | 9/1998 |
| WO | WO 99/37103 | 7/1999 |
| WO | WO 99/63773 | 12/1999 |

OTHER PUBLICATIONS

3GPP. "3rd Generation Partnership Project; Technical Specification Group Services and System Aspects; Architecture Principles for Release 2000" 3G TR 23.821 V1.0.1.
3GPP "3rd Generation partnership Project; Technical Specification Group Services and Systems Aspect; Architecture for and All IP Network".

(Continued)

*Primary Examiner*—Pramila Parthasarathy
(74) *Attorney, Agent, or Firm*—King & Spalding LLP

(57) ABSTRACT

The aim of the invention is to provide a particularly simple means of authentication and/or authorization of a station (MS) for the connection and/or service state control function (CSCF). To this end, identification information (IMSI) enabling the authentication/authorization of the station (MS) is provided when registration is requested at the remote access server (RAS).

22 Claims, 2 Drawing Sheets

OTHER PUBLICATIONS

3G TS 23.060 V3.1.0 3rd Generation partnership Project; Technical Specification Group Core Network; Digital cellular telecommunications system (Phase 2+); General Packet Radio Service (GPRS); Service description, Stage 2 (eg TS 23.060 version 3.1.0).

Napolitano et al. "UMTS all-IP mobility Management, Call and session control Procedures"—Mar. 24, 2000.

J. Eberspaecher et al. "GSM Global System for Mobile Communication".

Delphine "Call Control Scenarios in the "all IP" UMTS Core Network" IEEE International Symposium on Personal, Indoor and Mobile Radio Communication, vol. 1, Sep. 2000.

* cited by examiner

SYSTEM AND METHOD FOR REGISTERING A SUBSCRIBER STATION ON THE PACKET SERVICE CALL STATE CONTROL FUNCTION CSCF IN A COMMUNICATIONS SYSTEM

CLAIM FOR PRIORITY

This application claims priority to International Application No. PCT/DE01/01890 which was published in the German language on Nov. 29, 2001.

TECHNICAL FIELD OF THE INVENTION

The invention relates to a system and method for registering a station on the Call State Control Function CSCF in a packet-oriented communications system.

BACKGROUND OF THE INVENTION

New types of data services such as the packet data service GPRS (General Packet Radio Service) are currently being introduced into existing mobile networks based on the GSM standard. Transmission in the mobile network does not take place in a connection-oriented or circuit-switched manner, but in the form of packet data. This type of transmission more effectively utilizes the given transmission resources in the mobile network. The architecture for the packet data service assumes (see also FIG. 1) that the fixed or mobile data terminal or communications terminal used by the subscriber, e.g. a mobile station, is served at its respective location by a service network node (SGSN: Serving GPRS Support Node). Access to a packet data network is required in order to receive or transmit packet data. For this purpose, access network nodes (GGSN: Gateway GPRS Support Nodes) are provided, which in each case implement the access to the packet data network, e.g. the Internet, and support a specific packet data protocol e.g. the Internet Protocol (IP). A tunnel, via which the packets are transmitted, is provided in the mobile network between the service network node and the access network node.

Particularly for third-generation communications systems, e.g. the UMTS (Universal Mobile Telecommunication System), an architecture is provided for IP-based mobile networks which has an extension of the existing GPRS architecture in order to provide the call control components. One of the fundamental new components for this purpose is a Call State Control Function (CSCF). This function performs, inter alia, the call control functions previously performed by Mobile service Switching Centers (MSC). The Call State Control Function CSCF therefore also serves in particular as a connection control instance for multimedia services in the packet-switching or IP-based core network. The Call State Control Function CSCF which is responsible for a call is determined on a data-terminal-specific or subscriber-specific basis, i.e. it is defined by the Home Public Land Mobile Network HPLMN of the subscriber.

Registration of data terminals or mobile subscriber stations on the registration device, e.g. of the packet data network of the 3GPP standard (3GPP: 3rd Generation Partnership Project) which is currently being set up, is carried out in stages in two instances of the network. The first instance is the packet data service GPRS, whereby the procedures for the 3GPP system (GPRS Attach and PDP Context Activation) are already described and standardized. The second instance is the Call State Control Function. To register with the Call State Control Function CSCF, the subscriber must be authenticated and authorized, i.e. its identity and access authorization(s) are checked.

However, the current standard does not yet provide procedures for selection of the Call State Control Function CSCF or the authorization and authentication of a subscriber or data station communicating via any given IP protocol, e.g. SIP (Session Initiation Protocol) on the Call State Control Function CSCF, i.e. for registering a subscriber and checking its authorization. However, these procedures are absolutely essential for secure operation of e.g. packet-oriented 3GPP systems.

SUMMARY OF THE INVENTION

The invention discloses a system and method for registering a station on the Call State Control Function in a packet-oriented communications system.

In one embodiment, by transmitting the identification information, the method and the communications system offer a simple facility for authentication and authorization of a data terminal or station on the Call State Control Function of a packet data network.

Transfer of the international mobile subscriber identity or number as the identification information offers a particularly simple solution, since this is already individually allocated for the stations and therefore no specific identification information needs to be introduced.

Subsequent transfer of an access request corresponding to the identification information from the Call State Control Function to a device and/or function for authorization release and/or charge recording offers the simple facility for use of a device or function already provided for authentication/authorization.

Subsequent exchange of data with the station for authentication and/or authorization of the station enables a direct request for specific data, which can be delivered by the station without the intermediate connection of an unnecessarily large number of devices.

Allowing the device or function for charge recording, following receipt of the required data for authentication and/or authorization, to transfer an access confirmation corresponding to the identification information to the Call State Control Function enables direct release confirmation to the Call State Control Function.

Transfer of information relating to authorizations and/or restrictions of the authorization along with the access confirmation or in addition to this to the Call State Control Function offers the possibility for the requesting station to release specific resources. Restrictions may be imposed, for example, in terms of the radius or diameter of the current location.

Following the authentication and/or authorization of the station in the Call State Control Function, the registration and connection set-up can be continued in the usual manner. No further functions or devices need to be adapted or introduced.

Following registration in the Call State Control Function, the station MS or terminal can set up required connections, in particular connections via required Internet Protocol telephony protocols.

In another embodiment, there is a communications system in which the function for providing subscriber data for charge recording is advantageously subordinated to the home subscriber server, to which the Home Location Register HLR and the user mobility server can also be subordinated. The charge recording itself is advantageously performed in the Call State Control Function.

BRIEF DESCRIPTION OF THE DRAWINGS

An embodiment is explained in more detail below with reference to the drawing, in which.

DETAILED DESCRIPTION OF THE INVENTION

Figure 1:
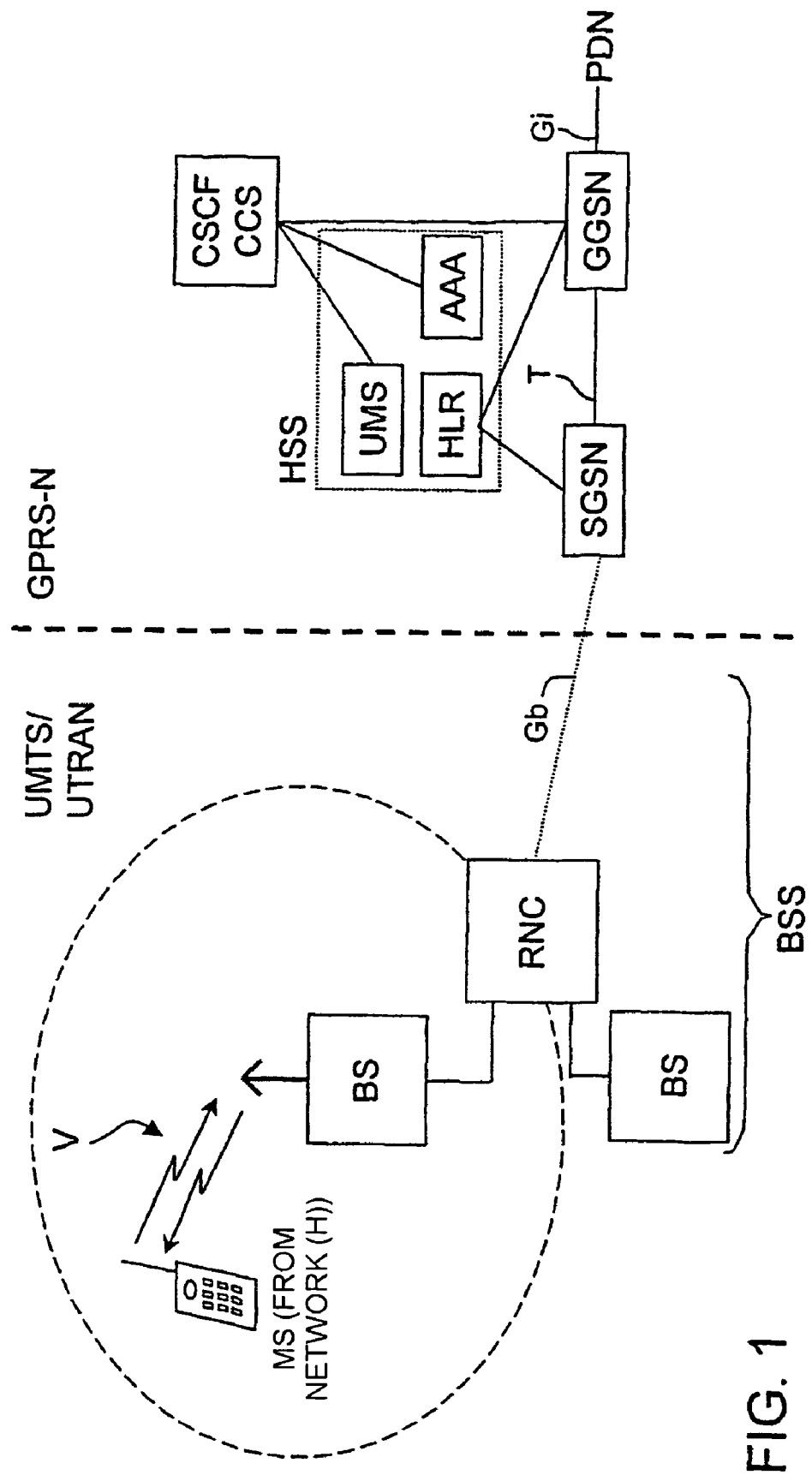
FIG. 1 shows a radio communications system with an interface for a packet data service.

The communications system shown in FIG. 1 shows a radio communications network with devices which enable a packet data service GPRS. A mobile station MS of a mobile subscriber, which is connected in a wireless manner via an air interface V to devices of a terrestrial UMTS radio network UTRAN (UMTS Terrestrial Radio Access Network) or its base station system BSS with fixed base stations BS, base station controllers and radio network controllers RNC, is shown as an example of a fixed or mobile communications terminal.

The connection to a packet-oriented communications network GPRS-N is set up by the UMTS radio network via the radio network controller RNC.

To transmit packet data between the mobile station MS and a packet data network PDN, the communications network GPRS-N has one or more service network nodes SGSN and at least one access network node GGSN connected thereto. The access network node GGSN is connected via an interface Gi to its own or to an external packet data network PDN, whereas the service network node SGSN is connected to the base station system BSS via an interface Gb. In other words, the communications system has a GPRS packet data network architecture with an IP-based packet data network GPRS-N and a UMTS radio network UTRAN on the radio side for communication with mobile and fixed radio stations MS. The service network node SGSN includes a packet relay which maps the interface Gb to the base station system BSS onto the interface T to the access network node GGSN, and forwards the data packets in both directions.

For the packet data service GPRS, no connection to packet data service network devices or to a packet data access network initially exists. In order to use a service, the mobile subscriber currently has to register with the network. In doing so, its identity and authorizations are checked in terms of general access to the data service GPRS. Next, a packet data protocol is activated. The packet data service network GPRS-N then provides, for example, a tunnel T between the relevant service network node SGSN and the required access network node GGSN to the packet data network PDN. Thereafter, packets can be exchanged via this tunnel T between the subscriber or the mobile station MS and the external packet data network PDN.

In the embodiment described below, the administration and transmission of data are at least partially supported or controlled by a Call State Control Function CSCF in the Call Control Server CCS. In the currently planned third-generation systems, the Call Control Server CCS is connected to the access network node GGSN. However, other connections and protocols can also be used.

Figure 2:
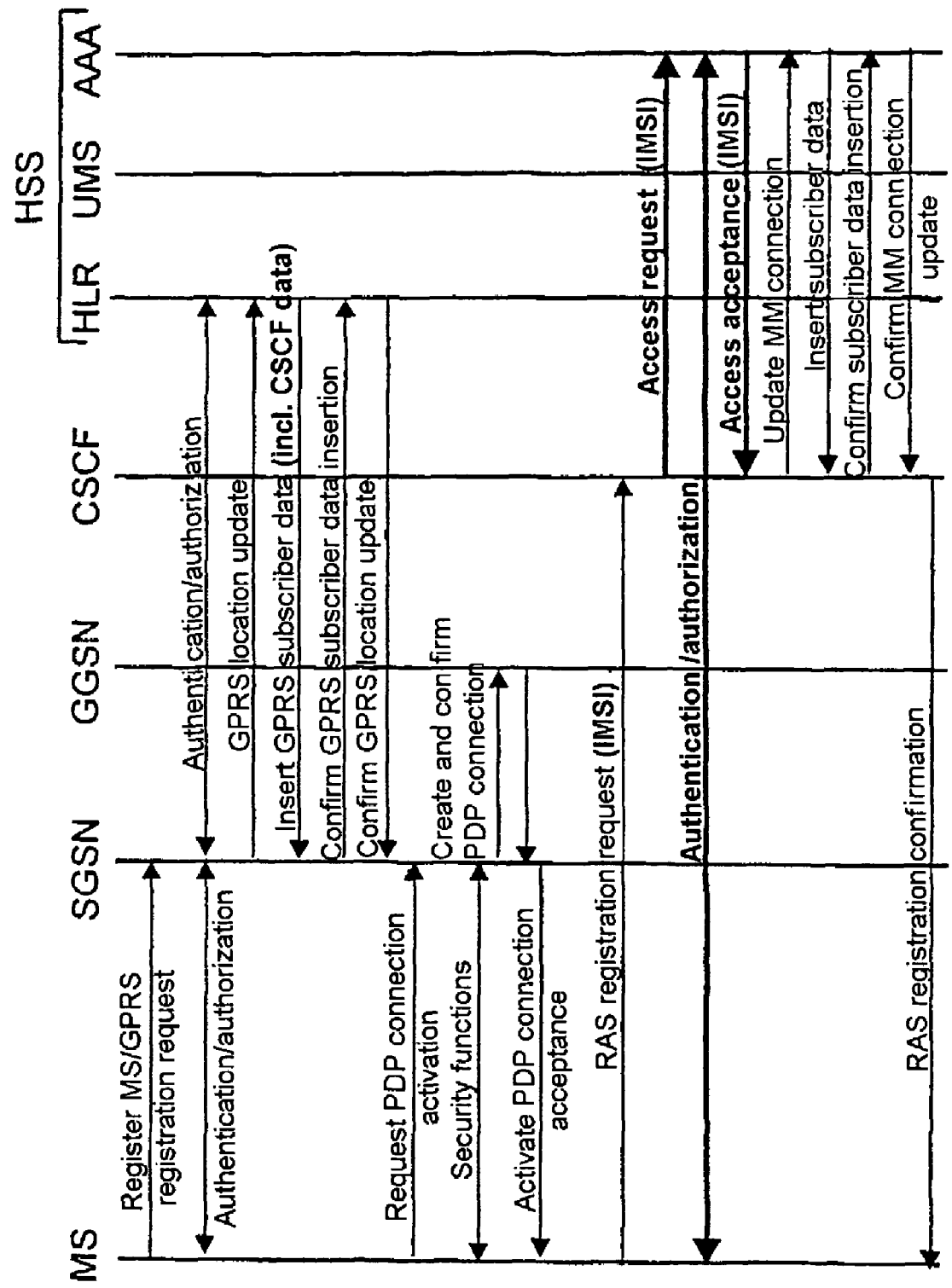
FIG. 2 shows a flowchart for the connection set-up in the registration of a radio station in a communications network.

An example of a connection set-up between a connection-oriented station MS and the packet data network GPRS-N is outlined in FIG. 2. The mobile station MS registers, for example, with the packet data network PDN. A connection set-up is requested by the station MS in a radio communications network UMTS/UTRAN, within the range of which the station MS is located, and is forwarded to the service network node SGSN "MS registration/GPRS registration request". Intermediate steps from the station MS to the service network node SGSN are not described in more detail below.

Thereafter, an authentication procedure takes place between the mobile station MS and the service network node SGSN or between the service network node SGSN and the Home Location Register HLR. The current location of the mobile station MS is then identified and the subscriber data inserted between the service network node SGSN and the Home Location Register HLR in a known manner. The request for a packet data service connection is then submitted by the mobile station MS to the service network node SGSN and security information is exchanged between them. The service network node SGSN and the access network node GGSN then create and confirm a packet data connection via the tunnel T, so that a connection to the packet data network PDN is made available to the mobile station MS. The mobile station MS is correspondingly notified by the service network node SGSN that the packet data connection can be activated.

Next, the mobile station MS requests a registration on a Remote Access Server RAS as part of the Call State Control Function CSCF, according to the present embodiment by transferring its own international mobile subscriber identity or number IMSI to the Call State Control Function CSCF. The information identifying which Call State Control Function CSCF is to be activated is transmitted in advance by the Home Location Register HLR during GPRS subscriber data insertion.

An access request corresponding to the international mobile subscriber identity IMSI is then transferred by the Call State Control Function CSCF to a charge-metering device or function depending on the Authentication and Authorization Accounting AAA. An authorization-release device or function should also be included instead of or simultaneously with the charge-metering device or function.

A direct or indirect information exchange then takes place via the Call State Control Function CSCF between the device for authorization/authentication AAA and the mobile station MS, in which the required data are exchanged, thereby enabling authentication and authorization of the mobile station MS in the authorization/authentication device AAA.

Once the required data have been received, the authorization/authentication device or function AAA transmits an access acceptance or access confirmation corresponding to the international mobile subscriber identity IMSI to the Call State Control Function CSCF. The authentication and authorization of the subscriber station MS are thus confirmed to the Call State Control Function CSCF.

The Call State Control Function CSCF can then update the mobility management (MM) connection in a known manner with the User Mobility Server UMS, and instigate the insertion of subscriber data. Confirmation of the registration on the Remote Access Server is then sent by the Call State Control Function CSCF to the station MS.

With this type of registration of a station MS on the Call State Control Function CSCF, the RAS registration request message particularly includes identification information which enables authentication of the station MS. The Home Subscriber Server HSS advantageously includes the function AAA for authorization, authentication and optionally for charge recording, the Home Location Register HLR and the User Mobility Server UMS. This charge-metering function AAA may then require an additional request to the station MS, e.g. a GSM authentication/authorization or an enquiry to the service network node SGSN of the packet data service GPRS, asking whether this subscriber or this station MS is already authenticated/authorized via the packet data service GPRS. Following successful authentication, the further procedure, in particular the UMTS procedure, can take place between the Home Subscriber Server HSS and the Call State Control Function CSCF. On completion of the registration in the Call State Control Function CSCF, the station MS or terminal can set up any required connections, in particular connections via any required Internet Protocol telephony protocols.

What is claimed is:

1. A method for registering a station on a Call State Control Function of a packet-oriented communications system, comprising:
   transmitting a request by a mobile device to a remote access server of the Call State Control Function for a registration of the mobile device on the remote access server, wherein
   the request for registration on the remote access server includes identification information which enables at least one of authentication and authorization of the mobile device, wherein an international mobile subscriber identity or number is transferred as identification information directly by the mobile device to the remote access server; and
   upon said authentication or authorization, registering the mobile device by the remote access server.

2. The method as claimed in claim 1, in which, from the Call State Control Function, an access request corresponding to the identification information is transferred to at least one of a device and a function for at least one of authorization release and charge recording.

3. The method as claimed in claim 2, in which, once the required data for the at least one of authentication and authorization of the mobile device have been received, the charge recording function transfers an access confirmation corresponding to the identification information to the Call State Control Function.

4. The method as claimed in claim 3, in which information relating to at least one of the authorization and restrictions of the authorization is transferred along with, or in addition to, the access confirmation to the Call State Control Function.

5. The method as claimed in claim 1, in which data for the at least one of authentication and authorization of the mobile device are exchanged with the mobile device.

6. The method as claimed in claim 1, in which a connection set-up is continued following the at least one of authentication and authorization of the station mobile device in the Call State Control Function.

7. A communications system, comprising:
   at least one partially packet-oriented communications network;
   at least one station configured to communicate via an interface with the communications network;
   at least one Call State Control Function of the packet-oriented part of the
   communications system to control at least one service in a connection of the station with a packet data network via the interface; and
   a device operable to at least one of authenticate and authorize the station in the Call State Control Function depending on identification information transmitted directly by the at least one station during the request for registration on a remote access server, wherein an international mobile subscriber identity or number is transferred as identification information.

8. The communications system as claimed in claim 7, in which the device is directly connected to the Call State Control Function.

9. The communications system as claimed in claim 8, in which the device has a charge-metering function.

10. The communications system as claimed in claim 7, in which the device has a charge-metering function.

11. A packet-oriented communication system for registering a station on a Call State Control Function, comprising:
    a remote access server of the Call State Control Function;
    a mobile device operable to transmit a request to the remote access server for a registration on the remote access server, wherein
    the request for registration on the remote access server includes identification information which enables at least one of authentication and authorization of the mobile device, wherein an international mobile subscriber identity or number is transferred as identification information directly by the mobile device to the remote access server; and
    wherein the remote access server is operable upon said authentication or authorization, to register the mobile device.

12. The system as claimed in claim 11, wherein the server is further operable to transfer an access request corresponding to the identification information to at least one of a device and a function for at least one of authorization release and charge recording.

13. The system as claimed in claim 11, wherein the server is further operable to exchange data with the mobile device for the at least one of authentication and authorization of the mobile device.

14. The system as claimed in claim 12, wherein, once the required data for the at least one of authentication and authorization of the mobile device have been received, the charge recording function is operable to transfer an access confirmation corresponding to the identification information to the Call State Control Function.

15. The system as claimed in claim 14, in which information relating to at least one of the authorization and restrictions of the authorization is transferred along with, or in addition to, the access confirmation to the Call State Control Function.

16. The system as claimed in claim 11, wherein said server is operable to perform a connection set-up following the authentication or authorization of the mobile device in the Call State Control Function.

17. A method for registering a station on a Call State Control Function of a packet-oriented communications system, comprising:
    generating in a mobile device a request for registration of the mobile device on a remote access server, wherein the request includes identification information which enables at least one of authentication and authorization of the mobile device, wherein an international mobile subscriber identity or number is included as identification information; and
    transmitting the request by the mobile device to the remote access server of the Call State Control Function for registration of the mobile device on the remote access server.

18. The method as claimed in claim 17, in which, from the Call State Control Function, an access request corresponding to the identification information is transferred to at least one of a device and a function for at least one of authorization release and charge recording.

19. The method as claimed in claim 17, in which data for the at least one of authentication and authorization of the mobile device are exchanged with the mobile device.

20. The method as claimed in claim 19, in which, once the required data for the at least one of authentication and authorization of the mobile device have been received, the charge recording function transfers an access confirmation corresponding to the identification information to the Call State Control Function.

21. The method as claimed in claim 20, in which information relating to at least one of the authorization and restrictions of the authorization is transferred along with, or in addition to, the access confirmation to the Call State Control Function.

22. The method as claimed in claim 17, in which a connection set-up is continued following the at least one of authentication and authorization of the mobile device in the Call State Control Function.

* * * * *